United States Patent
Gutnik

(10) Patent No.: US 7,836,310 B1
(45) Date of Patent: Nov. 16, 2010

(54) SECURITY SYSTEM THAT USES INDIRECT PASSWORD-BASED ENCRYPTION

(76) Inventor: Yevgeniy Gutnik, 1055 Manet Dr., Apt. 33, Sunnyvale, CA (US) 94087

( * ) Notice: Subject to any disclaimer, the term of this patent is extended or adjusted under 35 U.S.C. 154(b) by 1289 days.

(21) Appl. No.: 10/286,524

(22) Filed: Nov. 1, 2002

(51) Int. Cl.
G06F 21/00 (2006.01)
G06F 7/04 (2006.01)
G06F 17/30 (2006.01)
H04L 29/06 (2006.01)
H04L 9/32 (2006.01)
H04L 9/00 (2006.01)
H04L 9/28 (2006.01)
H04K 1/00 (2006.01)

(52) U.S. Cl. .................. 713/183; 713/161; 713/165; 713/168; 713/181; 713/182; 713/184; 713/185; 713/186; 726/4; 726/5; 726/6; 726/17; 726/18; 726/27; 380/255; 380/262; 380/268; 380/28

(58) Field of Classification Search .................. 713/161, 713/165, 168, 181–186; 726/4–6, 17, 18, 726/27; 380/28, 255, 262, 268
See application file for complete search history.

(56) References Cited

U.S. PATENT DOCUMENTS

| | | | |
|---|---|---|---|
| 4,203,166 | A | 5/1980 | Eshram et al. |
| 4,734,568 | A | 3/1988 | Watanabe |
| 4,757,533 | A | 7/1988 | Allen et al. |
| 4,796,220 | A | 1/1989 | Wolfe |
| 4,799,258 | A | 1/1989 | Davies |
| 4,827,508 | A | 5/1989 | Shear |
| 4,888,800 | A | 12/1989 | Marshall et al. |
| 4,972,472 | A | 11/1990 | Brown et al. |
| 5,032,979 | A | 7/1991 | Hecht et al. |
| 5,052,040 | A | 9/1991 | Preston et al. |
| 5,058,164 | A | 10/1991 | Elmer et al. |

(Continued)

FOREIGN PATENT DOCUMENTS

EP    0 672 991 A2    9/1995

(Continued)

OTHER PUBLICATIONS

"Inside Encrypting File System," Part 1, from MSDN Oct. 2001 version, exact publication date is unknown but believed prior to Dec. 12, 2001.

(Continued)

*Primary Examiner*—Aravind K Moorthy
(74) *Attorney, Agent, or Firm*—Sterne, Kessler, Goldstein & Fox P.L.L.C.

(57) ABSTRACT

An improved system and approaches for protecting passwords are disclosed. A file security system for an organization operates to protect the files of the organization and thus prevents or limits users from accessing some or all of the files (e.g., documents) associated with the organization. According to one aspect, a password entered by a user is used, provided it is authenticated, to obtain a respective authentication string (a relatively longer string of numbers or characters). The retrieved authentication string is then used to enable the user to enter the file security system and/or to access secured files therein. According to another aspect, user passwords are not stored in the file security system to avoid security breaches due to unauthorized capture of user passwords.

45 Claims, 10 Drawing Sheets

U.S. PATENT DOCUMENTS

| | | | |
|---|---|---|---|
| 5,144,660 A * | 9/1992 | Rose | 726/24 |
| 5,204,897 A | 4/1993 | Wyman | |
| 5,220,657 A | 6/1993 | Bly et al. | |
| 5,235,641 A | 8/1993 | Nozawa et al. | |
| 5,247,575 A | 9/1993 | Sprague et al. | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,434,918 A * | 7/1995 | Kung et al. | 713/169 |
| 5,495,533 A | 2/1996 | Linehan et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A * | 2/1997 | Kadooka | 726/18 |
| 5,655,119 A | 8/1997 | Davy | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,684,987 A | 11/1997 | Mamiya et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,719,941 A * | 2/1998 | Swift et al. | 713/155 |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,778,065 A * | 7/1998 | Hauser et al. | 713/155 |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schneck et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,987,440 A | 11/1999 | O'Neil et al. | |
| 5,991,879 A | 11/1999 | Still | |
| 5,999,907 A | 12/1999 | Donner | |
| 6,014,730 A | 1/2000 | Ohtsu | |
| 6,023,506 A * | 2/2000 | Ote et al. | 713/165 |
| 6,032,216 A | 2/2000 | Schmuck et al. | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A * | 5/2000 | Bodnar | 713/171 |
| 6,069,057 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,272,631 B1 | 8/2001 | Thomlinson et al. | |
| 6,272,632 B1 | 8/2001 | Carmen et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,299,069 B1 * | 10/2001 | Shona | 235/492 |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |
| 6,357,010 B1 | 3/2002 | Viets et al. | |
| 6,363,480 B1 | 3/2002 | Perlman | |
| 6,370,249 B1 | 4/2002 | Van Oorschot | |
| 6,381,698 B1 | 4/2002 | Devanbu et al. | |
| 6,389,433 B1 | 5/2002 | Bolosky et al. | |
| 6,389,538 B1 | 5/2002 | Gruse et al. | |
| 6,393,420 B1 | 5/2002 | Peters | |
| 6,405,315 B1 | 6/2002 | Burns et al. | |
| 6,421,714 B1 | 7/2002 | Rai et al. | |

| | | |
|---|---|---|
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B2 | 3/2005 | Novak |
| 6,874,139 B2 | 3/2005 | Krueger et al. |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 | 11/2005 | Witt et al. |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 * | 2/2006 | Henry et al. ............... 713/182 |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,046,807 B2 | 5/2006 | Hirano et al. |
| 7,051,213 B1 * | 5/2006 | Kobayashi et al. .......... 713/194 |
| 7,058,696 B1 | 6/2006 | Phillips et al. |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Takuya |
| 7,096,266 B2 | 8/2006 | Lewin et al. |
| 7,099,926 B1 | 8/2006 | Ims et al. |
| 7,107,269 B2 | 9/2006 | Arlein et al. |
| 7,107,416 B2 | 9/2006 | Stuart et al. |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |

| Patent/Pub No. | Date | Name |
|---|---|---|
| 7,237,002 B1 | 6/2007 | Estrada et al. |
| 7,249,044 B2 | 7/2007 | Kumar et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Smith et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,340,600 B1 * | 3/2008 | Corella .................. 713/155 |
| 7,380,120 B1 | 5/2008 | Garcia |
| 7,383,586 B2 | 6/2008 | Cross et al. |
| 7,386,529 B2 | 6/2008 | Kiessig et al. |
| 2001/0011254 A1 | 8/2001 | Clark |
| 2001/0021926 A1 | 9/2001 | Schneck et al. |
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0101072 A1 | 5/2003 | Dick et al. |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0154381 A1 | 8/2003 | Ouye |
| 2003/0159066 A1 | 8/2003 | Staw et al. |
| 2003/0172280 A1 * | 9/2003 | Scheidt et al. ............. 713/182 |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0182584 A1 * | 9/2003 | Banes et al. ................ 713/202 |
| 2003/0196096 A1 | 10/2003 | Sutton |
| 2003/0197729 A1 | 10/2003 | Denoue et al. |
| 2003/0200202 A1 * | 10/2003 | Hsiao et al. .................... 707/3 |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 * | 4/2004 | Toomey ..................... 709/224 |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1 | 7/2006 | Inoue et al. |
| 2006/0230437 A1 | 10/2006 | Boyer et al. |
| 2007/0006214 A1 | 1/2007 | Dubal et al. |

2007/0067837 A1    3/2007   Schuster

FOREIGN PATENT DOCUMENTS

| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

"Inside Encrypting File System," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS Works," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS," from MSDN Oct. 2001 version, exact publication date is unknown but believed prior to Dec. 12, 2001.

"Windows 2000 EFS," in the Apr. 1999 issue of *Windows NT Magazine*.

Expiration Mechanism for Chipcards, IBM Technical Disclosure Bulletin, Oct. 1, 2001, UK.

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

Microsoft Windows 200 server. Windows 2000 Group Policy White Paper, 2000.

Symantec. Norton Antivirus Corporate Edition Implementation Guide, 1999.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghom, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/028,397, entitled "Method and system for restricting use of a clipboard application," inventor Zuili, Dec. 21, 2001, 38 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities" inventor Vainstein, Dec. 20, 2002, 39 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files" inventor Ryan, Jun. 30, 2003, 33 pgs.

U.S. Appl. No. 10/448,806, entitled "Method and System for Using Remote Headers to Secure Electronic Files" inventor Ryan, May 30, 2003, 35 pgs.

U.S. Appl. No. 10/074,194, entitled "Methods for idnetifying compunds that inhibit or reduce PTP1B expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/186,203, entitled "Method and System for Implementing Changes to Security Policies in a Distributed Security System," inventor Huang, Jun. 26, 2002, 65 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Boneh et al., "Hierarchical Identity Based Encryption with Constant Size Ciphertext," Advances in Cryptology- Eurocrypt 2005, vol. 3493, Jun. 20, 2005, pp. 440-456.
Boneh et al., "IBE Secure E-mail," Stanford University, Apr. 8, 2002, http://crypto.stanford.edu/ibe/.

* cited by examiner

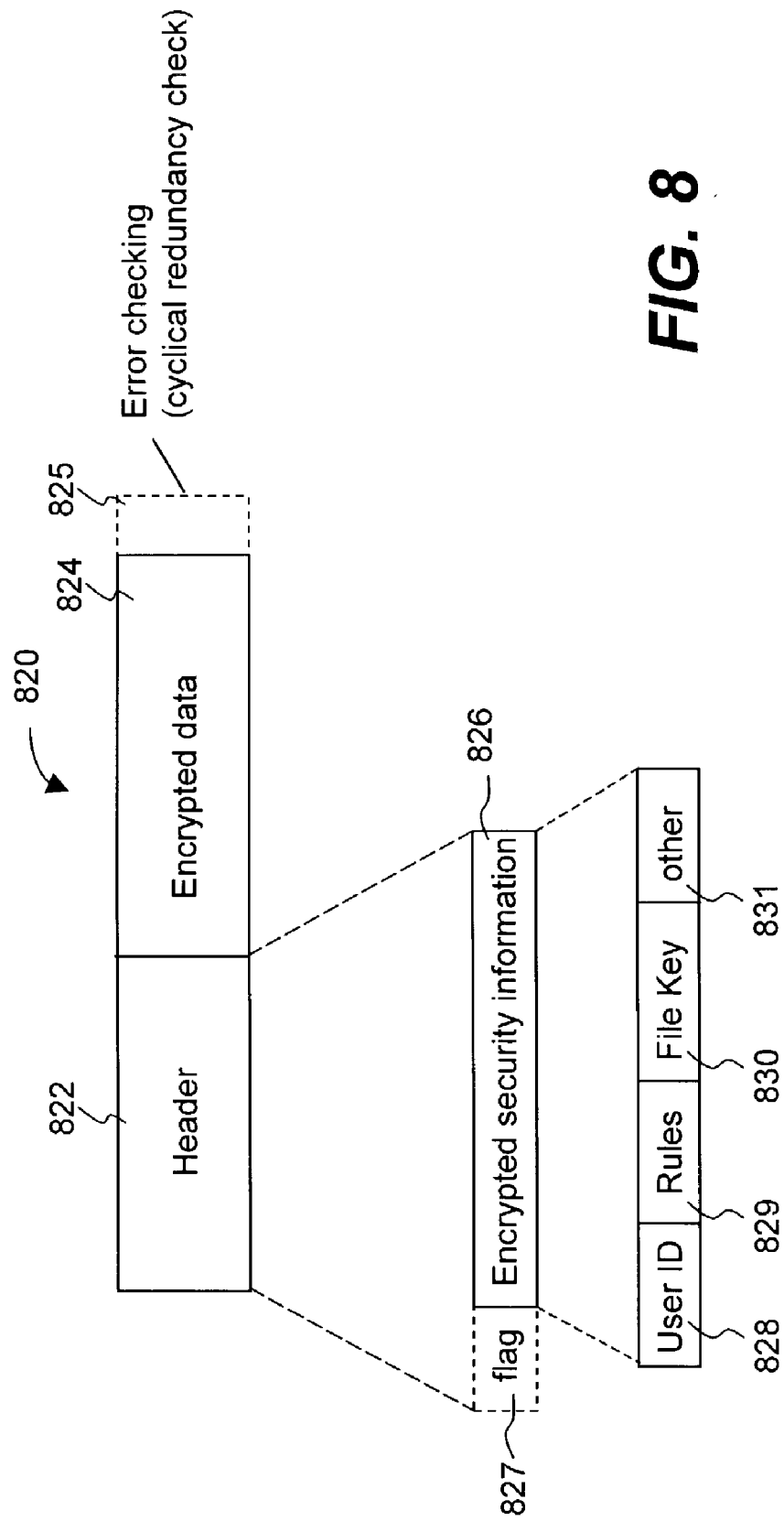

SECURITY SYSTEM THAT USES INDIRECT PASSWORD-BASED ENCRYPTION

CROSS-REFERENCE TO RELATED APPLICATION

This application is related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

As organizations become more dependent on networks for business transactions, data sharing and everyday communications, their networks have to be increasingly accessible to customers, employees, suppliers, partners, contractors and telecommuters. Unfortunately, as the accessibility increases, so does the exposure of critical data that is stored on the network. Hackers can threaten all kinds of valuable corporate information resources including intellectual property (e.g., trade secrets, software code and competitive data), sensitive employee information (e.g., payroll figures and HR records), and classified information (e.g., passwords, databases, customer records, product information and financial data).

In protecting the proprietary information traveling across networks, one or more cryptographic techniques are often used to secure a private communication session between two communicating computers on the network. Cryptographic techniques provide a way to transmit information across an unsecure communication channel without disclosing the contents of the information to anyone who may be eavesdropping on the communication channel. An encryption process is a cryptographic technique whereby one party can protect the contents of data in transit from access by an unauthorized third party, yet the intended party can read the data using a corresponding decryption process.

Many organizations have deployed firewalls, Virtual Private Networks (VPNs) and Intrusion Detection Systems (IDS) to provide protection. Unfortunately, these various security means have been proven insufficient to reliably protect proprietary information residing on internal networks.

Electronic data is often secured through use of passwords. The passwords can be document level, operating system level or system level. While passwords do provide some security to the electronic data, users tend to mismanage their passwords. For example, users may use short passwords which are easier for an attacker to crack, resulting in possible security breaches of a system. To facilitate the use of passwords, a system has to maintain somewhere information pertaining to the passwords. However, by doing so, the passwords are put in jeopardy of being discovered by an attacker.

Moreover, security policies often request passwords be periodically changed to improve security of a system. Also, in a security system that encrypts data based on user passwords, changing user passwords can be very complicated and result in time consuming updating of all affected encrypted data in the system.

Thus, there is a need for improved approaches to utilize passwords in a security system.

SUMMARY OF THE INVENTION

The invention relates to an improved system and approaches for protecting passwords. A security system for an organization operates to protect the files of the organization and thus prevents or limits users from accessing some or all of the files (e.g., various data and documents) associated with the organization. Passwords are normally required by users seeking to access the files protected by the security system. According to one aspect of the invention, a password entered by a user is used, provided it is authenticated, to obtain a respective authentication string (a relatively longer string of numbers or characters). The retrieved authentication string is then used to enable the user to enter the security system and/or to access secured files therein. According to another aspect of the invention, user passwords are not stored in the security system to avoid security breaches due to unauthorized capture of user passwords.

The present invention may be used in many types of security systems. To facilitate the description of the present invention, unless specifically stated, a security system or a file security system is interchangeably used herein. The invention can be implemented in numerous ways, including as a method, system, device, and computer readable medium. Several embodiments of the invention are discussed below.

As a method for authenticating a user to a file security system, one embodiment of the invention includes at least the acts of: receiving a user-entered password to gain access to files protected by the file security system; generating a random number of a predetermined length; converting the random number into an authentication string; encrypting the authentication string using the user-entered password to produce an encrypted authentication string; and storing the encrypted authentication string in the file security system for subsequent usage.

As a method for authenticating a user to a file security system, another embodiment of the invention includes at least the acts of: receiving a user-entered password to gain access to files protected by the file security system; accessing an encrypted authentication string from the file security system; decrypting the encrypted authentication string with the user-entered password to produce an authentication string; determining whether the user is authenticated; permitting access to the file security system when the determining determines that the user is authenticated; and denying access to the file security system when the determining determines that the user is not authenticated.

As a method for re-authenticating a user to a file security system where the user was previously authenticated to the file security system, one embodiment of the invention includes at least the acts of: determining whether a re-authorization condition exists; and re-authenticating the user to the file security system when the re-authorization condition exists. Further, according to the embodiment, the re-authenticating includes at least the acts of: receiving a user-entered password; accessing an encrypted authentication string from the file security system; decrypting the encrypted authentication string with the user-entered password to produce an authentication string; determining whether the user is re-authenticated; permitting access to the file security system when the determining determines that the user is re-authenticated; and denying access to the file security system when the determining determines that the user is not re-authenticated.

As a method for changing a password of a user, the password being associated with a file security system, one embodiment of the invention includes at least the acts of: receiving a new user-entered password to gain access to files protected by the file security system; receiving an existing user password; accessing an encrypted authentication string from the file security system; decrypting the encrypted authentication string with the existing user password to produce an authentication string; determining whether the user is authenticated; denying the user from changing the password from the existing user password to the new user-entered password when the determining determines that the user is not authenticated; and permitting the user to change the password from the existing user password to the new user-entered password when the determining determines that the user is authenticated. Additionally, the method can further include the act of encrypting the authentication string with the new user-entered password.

As a computer readable medium including at least computer program code for authenticating a user to a file security system, one embodiment of the invention includes at least: computer program code for receiving a user-entered password to gain access to files protected by the file security system; computer program code for generating a random number of a predetermined length; computer program code for converting the random number into an authentication string; computer program code for encrypting the authentication string using the user-entered password to produce an encrypted authentication string; and computer program code for storing the encrypted authentication string in the file security system for subsequent usage.

As a computer readable medium including at least computer program code for authenticating a user to a file security system, another embodiment of the invention includes at least: computer program code for receiving a user-entered password to gain access to files protected by the file security system; computer program code for accessing an encrypted authentication string from the file security system; computer program code for decrypting the encrypted authentication string with the user-entered password to produce an authentication string; computer program code for determining whether the user is authenticated; computer program code for permitting access to the file security system when the computer program code for determining determines that the user is authenticated; and computer program code for denying access to the file security system when the computer program code for determining determines that the user is not authenticated.

As a computer readable medium including at least computer program code for re-authenticating a user to a file security system, where the user was previously authenticated to the file security system, one embodiment of the invention includes at least: computer program code for determining whether a re-authorization condition exists, and computer program code for re-authenticating the user to the file security system when the re-authorization condition exists. Further, according to one embodiment, the computer program code for re-authenticating includes at least: computer program code for receiving a user-entered password; computer program code for accessing an encrypted authentication string from the file security system; computer program code for decrypting the encrypted authentication string with the user-entered password to produce an authentication string; computer program code for determining whether the user is re-authenticated; computer program code for permitting access to the file security system when the computer program code for determining determines that the user is re-authenticated; and computer program code for denying access to the file security system when the computer program code for determining determines that the user is not re-authenticated.

As a computer readable medium including at least computer program code for changing a password of a user, the password being associated with a file security system, one embodiment of the invention includes at least: computer program code for receiving a new user-entered password to gain access to files protected by the file security system; computer program code for receiving an existing user password; computer program code for accessing an encrypted authentication string from the file security system; computer program code for decrypting the encrypted authentication string with the existing user password to produce an authentication string; computer program code for determining whether the user is authenticated; computer program code for denying the user from changing the password from the existing user password to the new user-entered password when the computer program code for determining determines that the user is not authenticated; and computer program code for permitting the user to change the password from the existing user password to the new user-entered password when the computer program code for determining determines that the user is authenticated. Additionally, the computer readable medium can further include computer program code for encrypting the authentication string with the new user-entered password.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which:

FIG. 8 shows an exemplary data structure of a secured file that may be used in one embodiment of the invention.

DETAILED DESCRIPTION OF THE INVENTION

Figure 1:
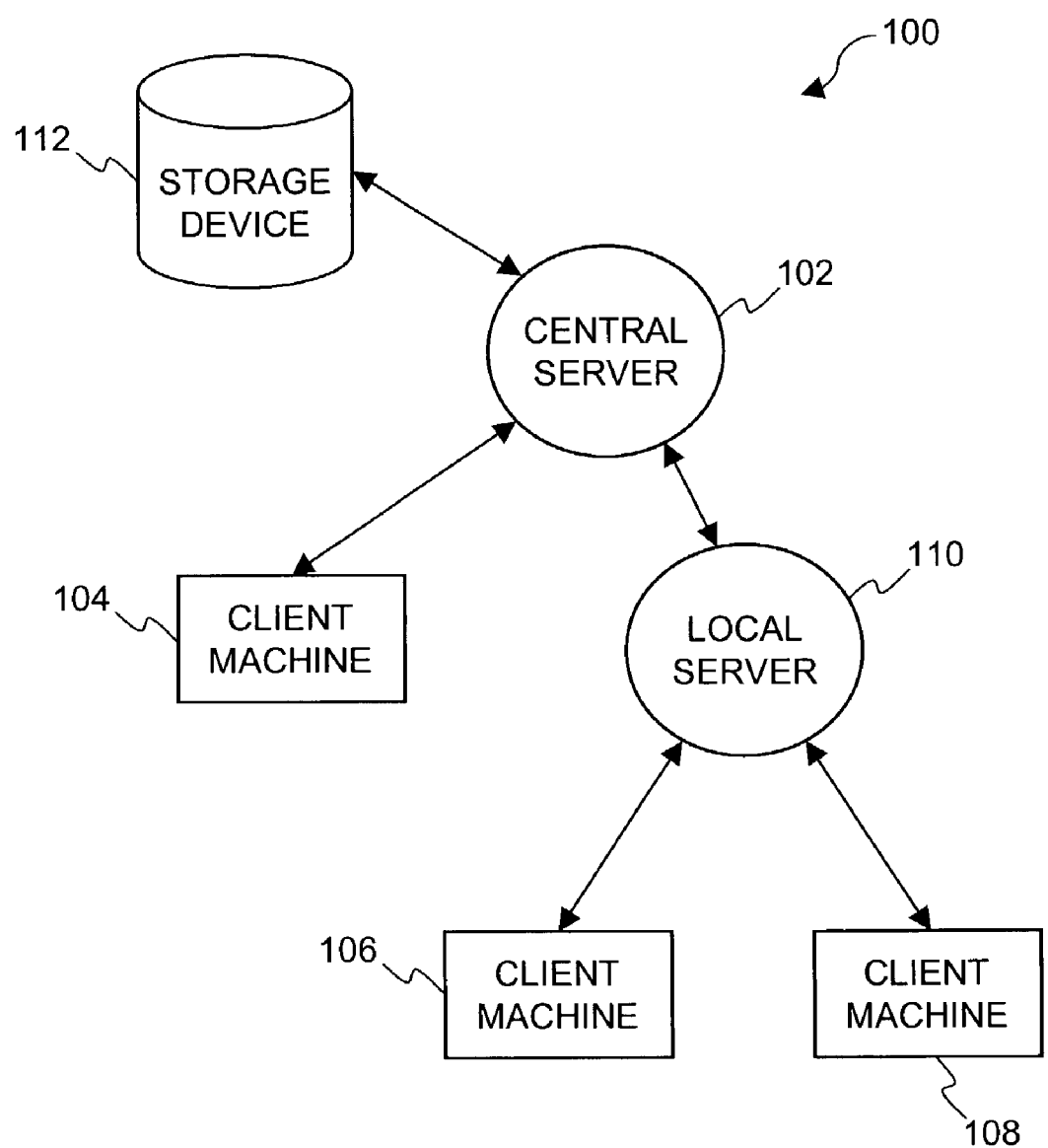
FIG. 1 is a file security system according to one embodiment of the invention.

The invention relates to an improved system and approaches for protecting passwords. A file security system for an organization operates to protect the files of the organization and thus prevents or limits users from accessing some or all of the files (e.g., documents) associated with the organization. Passwords are normally required by users seeking to access the files protected by the file security system. According to one aspect of the invention, a password entered by a user is used, provided it is authenticated, to obtain a respective authentication string (a relatively longer string of numbers or characters). The retrieved authentication string is then used to enable the user to enter the file security system and/or to access secured files therein. According to another aspect of the invention, user passwords are not stored in the file security system to avoid security breaches due to unauthorized capture of user passwords. The invention is suitable for use in an enterprise file security system.

A file security system (or document security system) serves to limit access to files (documents) only to authorized users. Often, an organization, such as a company, would use a file security system to limit access to its files (documents). For example, users of a group might be able to access files (documents) pertaining to the group, whereas other users not within the group would not be able to access such files (documents). Such access, when permitted, would allow a user of the group to retrieve a copy of the file (document) via a data network.

Secured files are files that require one or more keys, passwords, access privileges, etc. to gain access to their content. In one embodiment, the security is provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains or points to security information. The security information is used to determine whether access to associated data portions of secured files is permitted.

As used herein, a user may mean a human user, a software agent, a group of users, a member of a group of users, a device and/or application. Besides a human user who needs to access a secured document, a software application or agent sometimes needs to access secured files in order to proceed. Accordingly, unless specifically stated, the "user" as used herein does not necessarily pertain to a human being.

In the following description, numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-8. However, those skilled in the art will readily appreciate that the detailed description given herein with respect to these figures is for explanatory purposes as the invention extends beyond these limited embodiments.

FIG. 1 is a file security system 100 according to one embodiment of the invention. The file security system 100 includes a central server 102 that provides access control to various files (e.g., documents). The access control ensures that only authorized users are able to access the files. Users can interact with the central server 102 through client machines 104, 106 and 108.

The file security system 100 can also make use of one or more local servers 110. The local server 110 illustrated in FIG. 1 serves to locally process some of the access control operations that would otherwise be performed by the central server 102. The presence of the local server 110 allows the client machines 106 and 108 to obtain more reliable and faster service with respect to access control provided by the file security system 100. Hence, the local server 110 is not a necessity but, if provided, can serve to enhance the responsiveness and reliability of the system.

Files are typically secured through encryption and stored in a storage device. For example, files (secured files) can be stored to a storage device 112 that is accessible by any of the client machines 104, 106 and 108 via the central server 102. Additionally, each of the client machines 104, 106 and 108 can provide their own local storage for files (secured files). For example, a user of the client machine 104 may store files pertaining to the user at the client machine 104 as well as at the storage device 112. Regardless of where the secured files are stored, for a user to be permitted access to the secured files, the file security system 100 requires that the user enter a user password at the client machine 104. The user password is then processed to determine whether the user is able to be authenticated. Thereafter, when properly authenticated, the user is thereafter able to access the secured files stored locally or remotely.

The file security system 100 is configured to utilize the user password indirectly. In other words, access to secured files in the file security system 100 is not granted based on a user password provided by an authorized user; instead, access is based on an authenticated string. The authentication string can take various forms. In one embodiment, the authentication string can be 128-bits in length and consist of numbers or characters which can be converted to 32-bytes (256 bits). For example, a user at a client machine would utilize her user password to log into a client machine (e.g., client machine 106). However, the client machine would only temporarily retain the user password in volatile memory (e.g., random access memory (RAM)) and would not use the user password to proceed with the entry to the file security system 100. Instead, the client machine is configured to use an authenticated string that is encrypted using the user password. The encrypted authentication string is stored in non-volatile memory (e.g., a file stored to a disk drive) of the client machine. After the user successfully logs into the client machine, the authenticated string is retrieved (e.g., decrypted with the provided user password) and then used to access the file security system 100 or the secured files therein.

Often, for ease of remembering, a user password pertains to some features related to its user and is relatively short, typically not more than 20 characters. In contrast, an authentication string can be made artificially long and random, such as 101101 . . . 10111 (binary) or AB01F98 . . . 001 (hexadecimal). Cracking an authentication string is much more difficult, if not possible, than cracking a user password. Consequently, access based on an authentication string to the file security system 100 is a lot more secure. Attacks to the file security system 100 by unauthorized users are thus made more difficult because user passwords are only indirectly used. Still further, the file security system 100 is able to easily perform password modifications (or changes) because the authentication string is not altered, though the encrypted authentication string would be altered given a new user password. Moreover, producing the new encrypted authenticated string is computationally easy to perform and thus can be performed quickly, even at run-time if so desired.

Figure 2A:
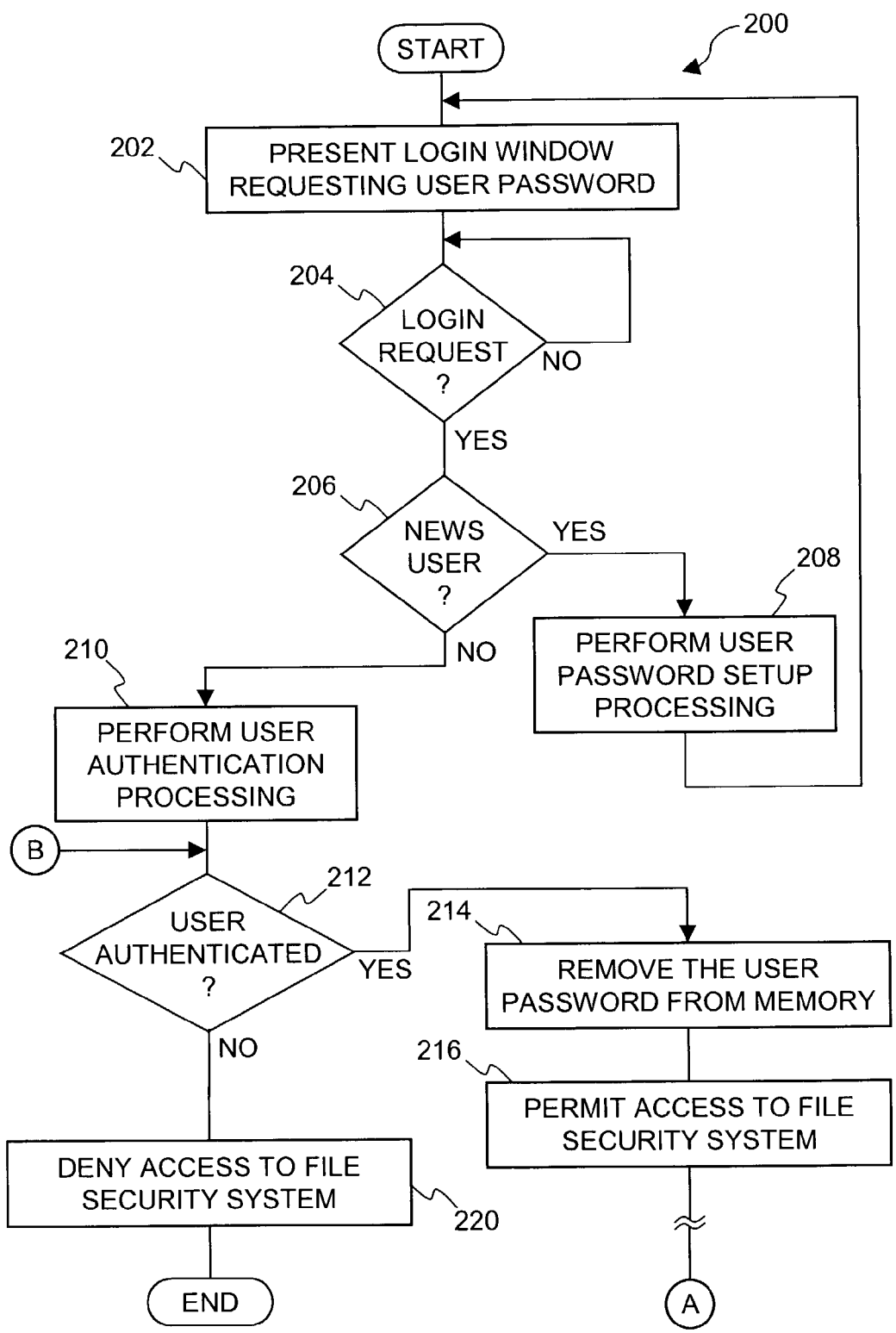
FIGS. 2A and 2B are flow diagrams of security system processing according to one embodiment of the invention.
Figure 2B:
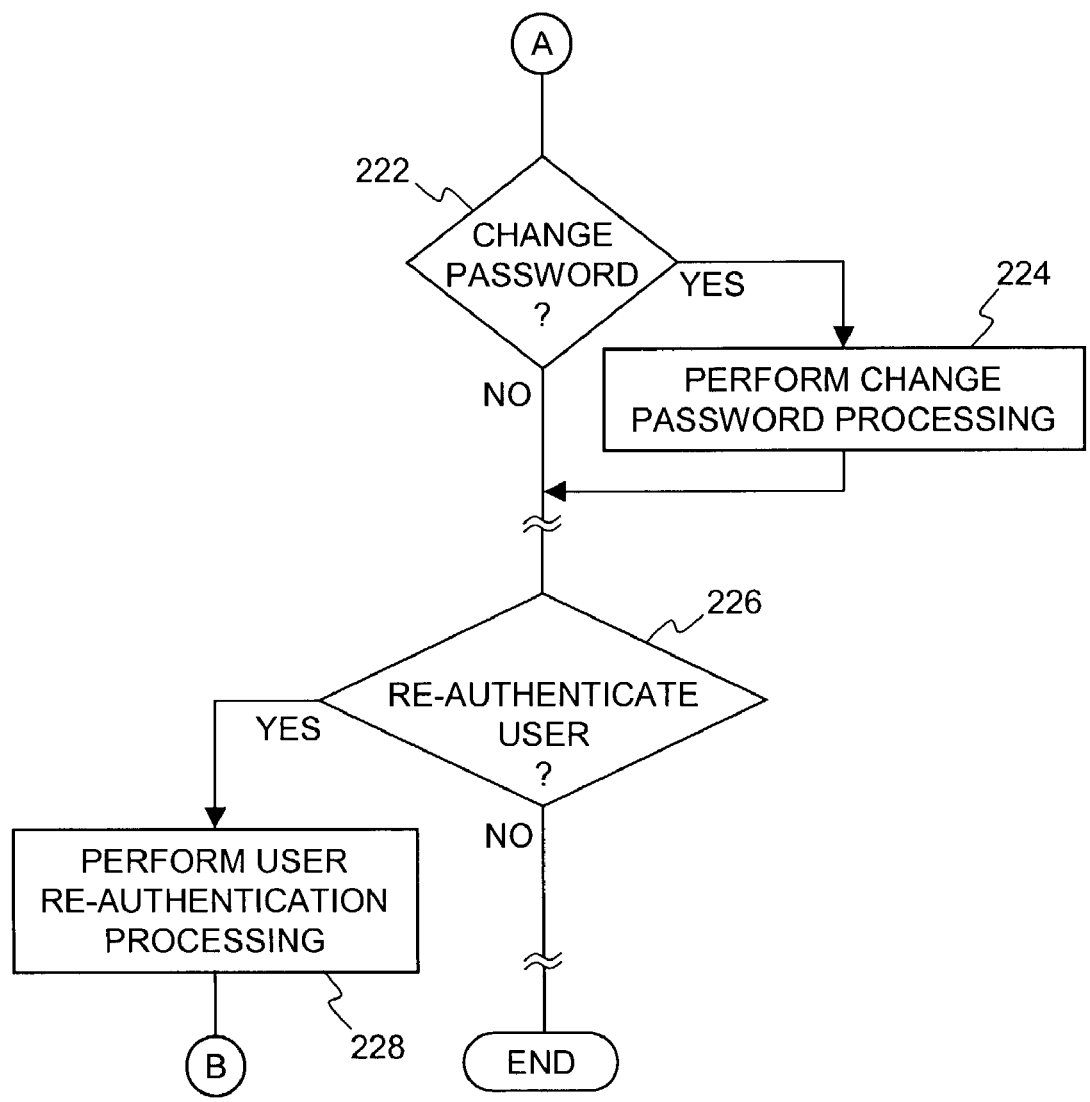

FIGS. 2A and 2B are flow diagrams of security system processing 200 according to one embodiment of the invention. The security system processing 200 can be performed locally on a client machine or remotely on a server machine, or partially at the client machine and partially at the server machine. As an example, the client machine can be any of the client machines 104, 106 and 108 illustrated in FIG. 1, and the server machine can be either the central server 102 or the local server 110 illustrated in FIG. 1.

The security system processing 200 initially presents 202 a login window requesting that the user enter a user password. A decision 204 then determines whether a login request has been received. A login request is received when the user has entered the user password into the login window and requested login. When the decision 204 determines that a login request has not yet been received, the security system processing 200 awaits such a request. Once the decision 204 determines that a login request has been received, then a decision 206 determines whether the user is a new user. For example, the login window might also ask for a user identifier or user name, and a mismatch of any data identifying the user would signal that the user is a new user.

In any case, when the decision 206 determines that the user is a new user, then user password setup processing is performed 208 so as to set up the user as an authorized user of the file security system. It is assumed herein that the user (e.g., a new employee) has been authorized to access the file security system. The user password setup processing 208 can be achieved by an administrator or the user him/herself. Following the operation 208, the security system processing 200 returns to the beginning of the security system processing 200 so that the user may then log into the file security system.

On the other hand, when the decision 206 determines that the user is not a new user, then user authentication processing is performed 210 to determine whether the user is able to be successfully authenticated. A decision 212 then determines whether the user has been authenticated. When the decision 212 determines that the user has been successfully authenticated, then the user password is used to obtain a corresponding authentication string. The authentication string is stored or distributed in a secured manner and can only be recovered for use when a correct password is provided. According to one embodiment, the authentication string is encrypted in a file (e.g., xyz.aes when AES is used) and can only be recovered when a correct user password (e.g., passphrase) is provided. Here, the user password, when received via the login request, is temporarily stored in volatile memory (e.g., RAM). Hence, at operation 214, the previously temporarily stored user password is removed (e.g., deleted) from the volatile memory. Next, access to the file security system is permitted 216 since the user has been authenticated and thus is able to be logged into the file security system with the authentication string.

Alternatively, when the decision 212 determines that the user has not been properly authenticated, then access to the file security system is thus denied 220. Following the operation 220, the security system processing 200 ends with access to the file security system being denied.

Following the operation 216, various different operations can be performed by the security system processing 200. Two of various security related operations that are able to be performed before, during or after other operations that the file security system might perform, include password changes and user re-authentication. More particularly, a decision 222 can determine whether a password change is being requested. When the decision 222 determines that a password change is being requested, then change password processing can be performed 224. Alternatively, a decision 226 determines whether user re-authentication is requested. When the decision 226 determines that user re-authentication is requested, then user re-authentication processing is performed 228. Following the operation 228, the security system processing 200 returns to repeat the decision 212 and subsequent operations. Eventually, if no other operations are to be performed, including password change and user re-authentication, the security system processing 200 ends.

Figure 3:
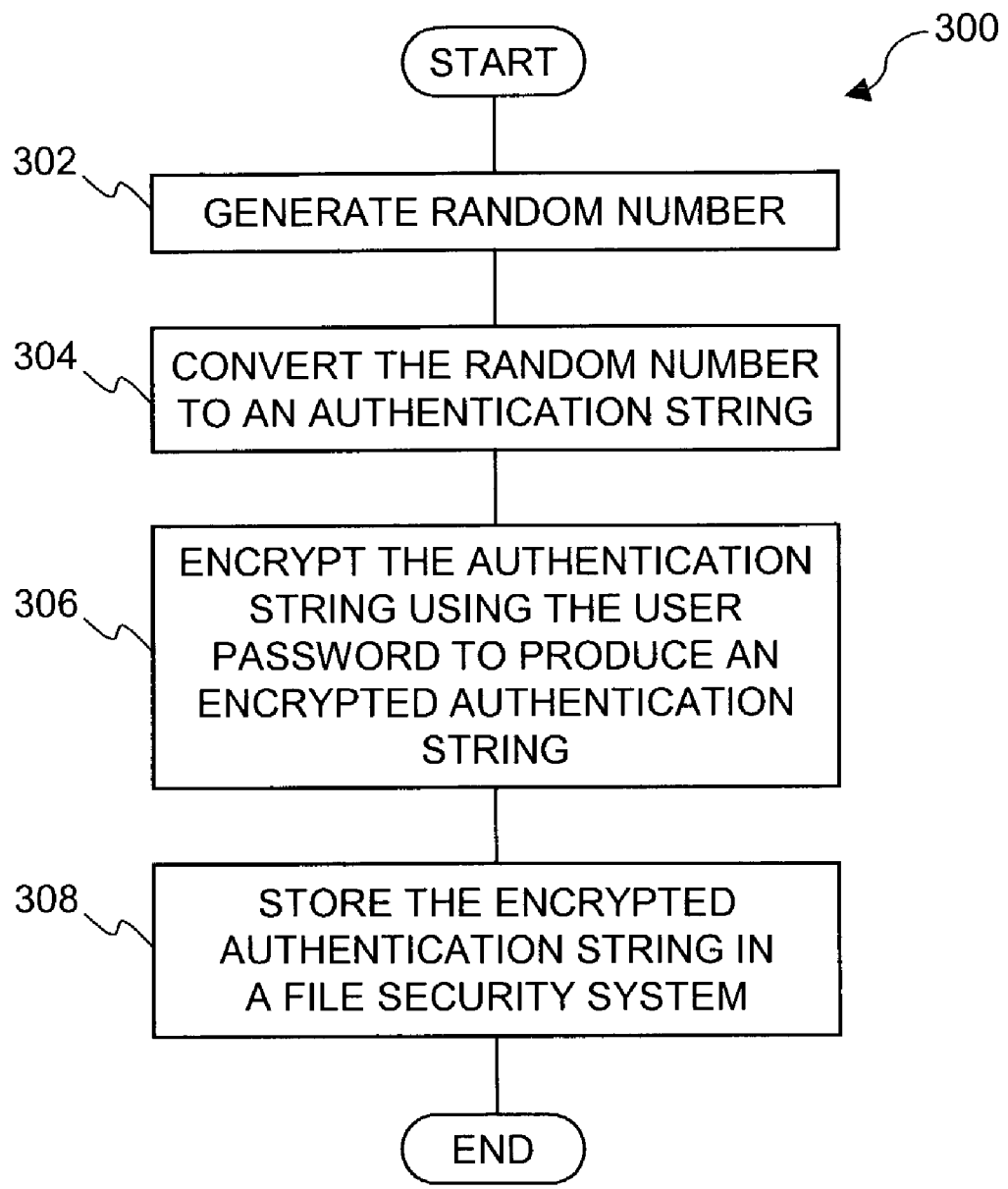
FIG. 3 is a flow diagram of user password setup processing according to one embodiment of the invention.

FIG. 3 is a flow diagram of user password setup processing 300 according to one embodiment of the invention. The user password setup processing 300 is typically performed when a new user desires to set up a user password and thus be permitted to gain access to certain files within a file security system using the user password.

The user password setup processing 300 generates 302 a random number. Typically, the random number is generated by a random number generator provided by a computing device (e.g., client machine). Normally, the random number would be of a predetermined length. For example, the random number can be 1024 bits. Next, the random number is converted 304 to an authentication string. For example, the random number is a binary numerical value and its conversion into the authentication string involves converting the binary number to a hexadecimal value. As a result, the random number is converted into a string, which itself is a random string. The authentication string is then encrypted 306 using the user password to produce an encrypted authentication string. The user password used in encrypting 306 the authentication string was previously entered by the user. For example, the user might have entered the user password in response to the login window presented 202 during the security system processing 200 shown in FIG. 2A. The encrypted authentication string can also be considered a cipher-text. After the encrypted authentication string has been produced, the encrypted authentication string is stored 308 in a computing system so that the encrypted authentication string can later be retrieved and decrypted with a correct user password. Typically, the file security system is distributed between one or more client machines and one or more server machines. Hence, in one embodiment, the encrypted authentication string is stored 308 to the client machine. For example, the encrypted authentication string can be stored to a file at the client machine. In general, the encrypted authentication string can be stored to a client machine and/or a server machine. Following the operation 308, the user password setup processing 300 is complete and ends.

In effect, the authentication string serves as a password that is rather long and random. Such password can be considered as an indirect password and be used to enter (e.g., log into) the file security system to access secured files, secure files, and other operations involving security (e.g., certificates imports and exports).

Figure 4:
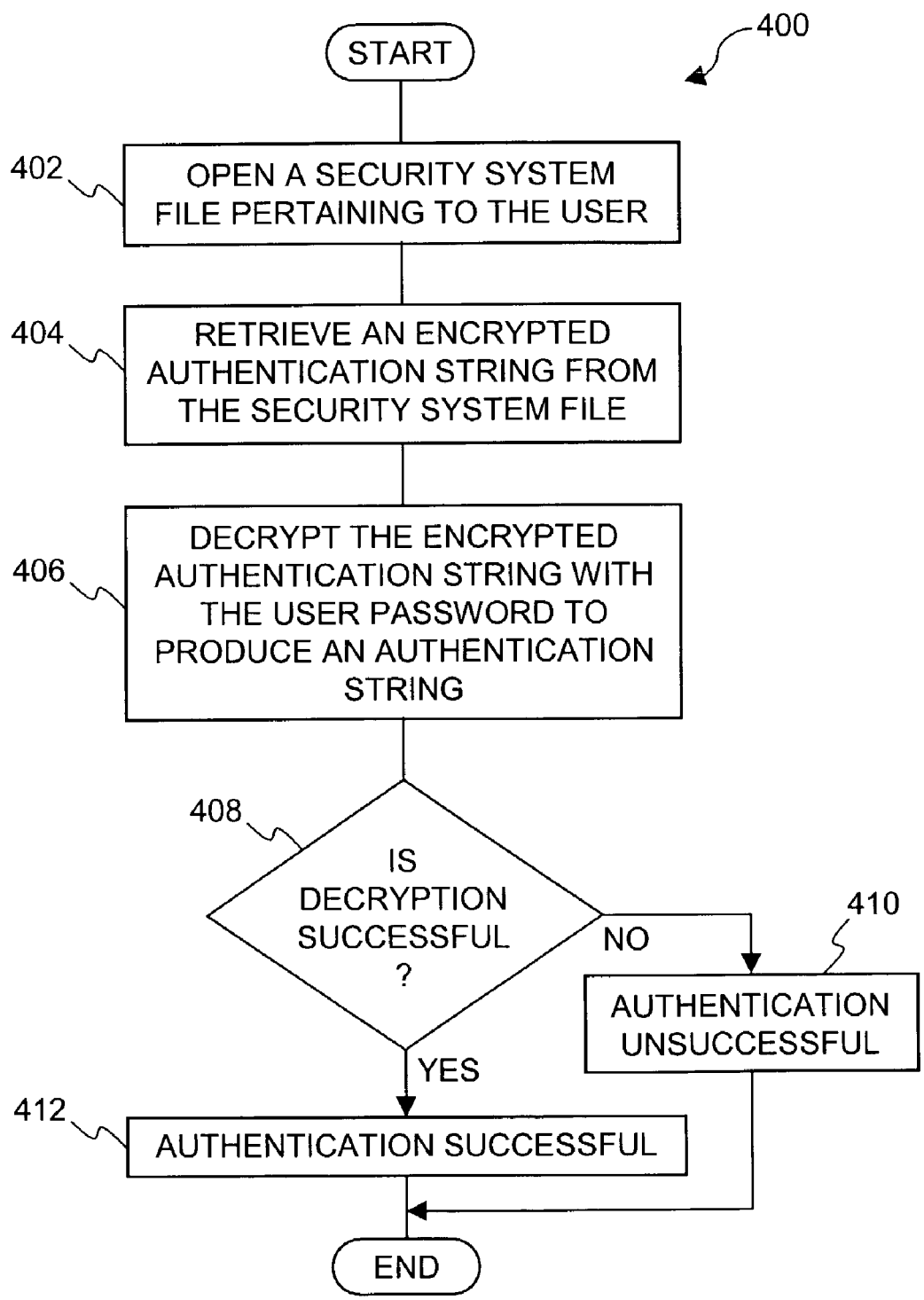
FIG. 4 is a flow diagram of user authentication processing according to one embodiment of the invention.

FIG. 4 is a flow diagram of user authentication processing 400 according to one embodiment of the invention. The user authentication processing 400 represents processing that can be performed to carry out the operation 210 illustrated in FIG. 2A.

The user authentication processing 400 initially opens 402 a security system file pertaining to the user. The security system file is a file maintained by the file security system that includes the encrypted authentication string associated with the user. For example, the security system file can store the encrypted authentication string due to operation 308 of the user password setup processing 300. Here, the security system file is opened 402 at least when user authentication is to be performed.

After the security system file has been opened 402, an encrypted authentication string associated with the user is retrieved 404 from the security system file. Next, the encrypted authentication string is decrypted 406 using the user password. Note that the user password was previously entered (e.g., during a login request) and can be held in non-volatile memory until the user authentication processing 400 is performed. The result of the decryption 406 of the encrypted authentication string produces an authentication string. A decision 408 then determines whether the decryption 406 of the encrypted authentication string was successful. In other words, the authentication string is used to determine whether the user is able to be properly and correctly authenticated based upon the decryption 406 of the encrypted authentication string with the user password supplied by the user. When the decision 408 determines that decryption of the encrypted authentication string was not successful (i.e., fails) then authentication is deemed 410 to be unsuccessful. On the other hand, when the decision 408 determines that decryption of the encrypted authentication string was successful then authentication is deemed 412 to be successful. Following the operations 410 and 412, the user authentication processing 400 is complete and ends.

Figure 5A:
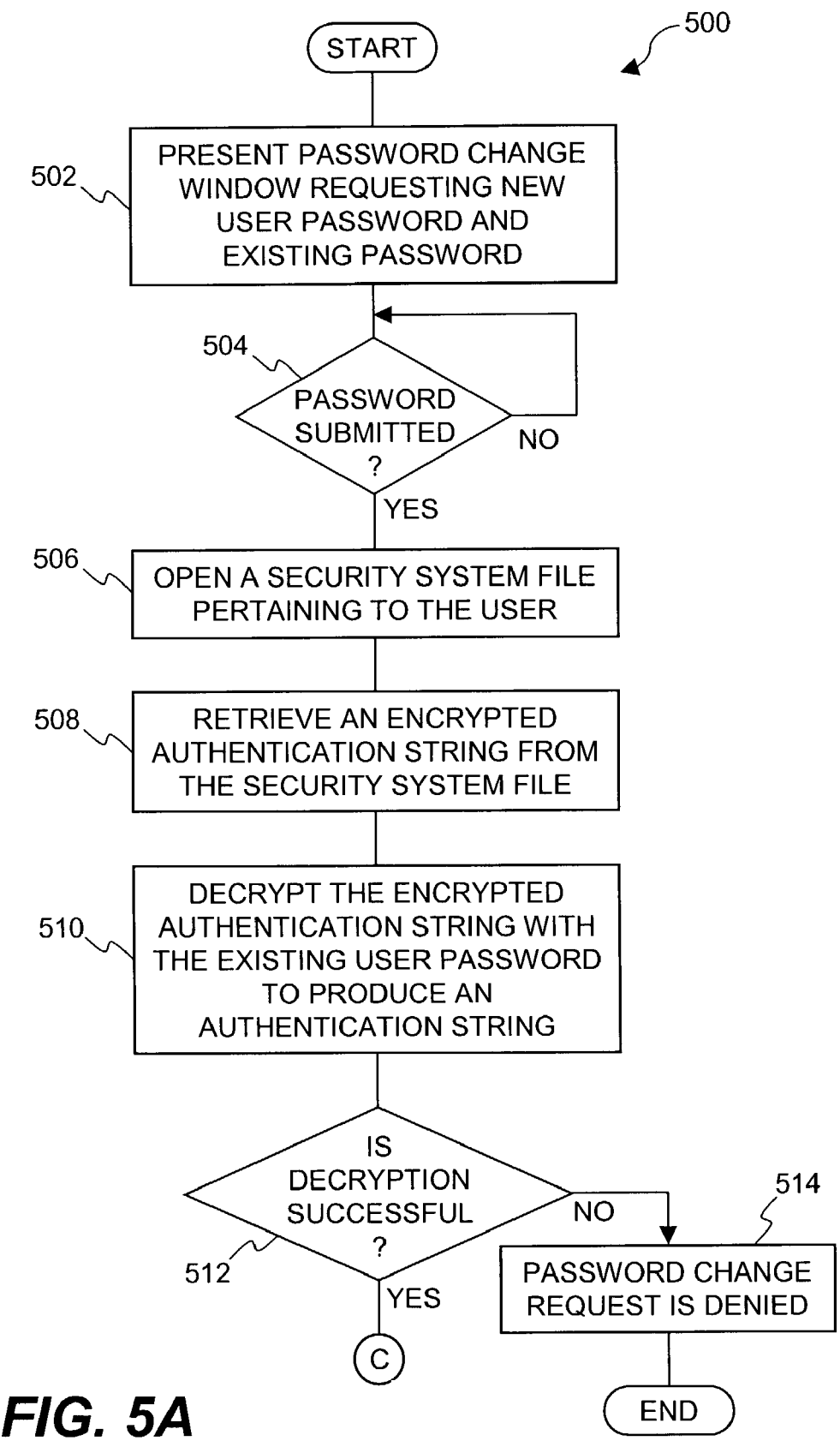
FIGS. 5A and 5B are flow diagrams of change password processing according to one embodiment of the invention.
Figure 5B:
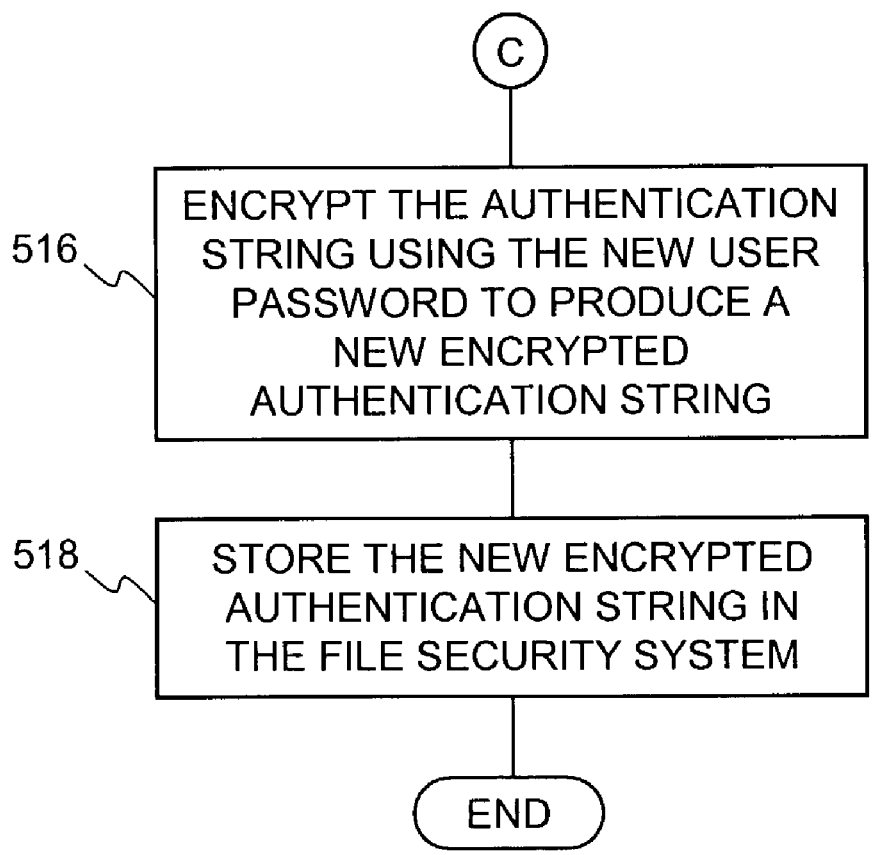

FIGS. 5A and 5B are flow diagrams of change password processing 500 according to one embodiment of the invention. The change password processing 500 is, for example, processing performed by the change password processing associated with the operation 224 illustrated in FIG. 2B.

The change password processing 500 initially presents 502 a password change window that requests a new user password (and perhaps an existing password). Typically, the password change window would be presented 502 at a client machine associated with the user. Next, a decision 504 determines whether the password(s) has/have been submitted. When the decision 504 determines that the password(s) have not yet been submitted, then the change password processing 500 awaits such password(s). On the other hand, when the decision 504 determines that the password(s) have been submitted, then the security system file pertaining to the user is opened 506. Next, an encrypted authentication string is retrieved 508 from the security system file. After the encrypted authentication string has been retrieved 508, the encrypted authentication string is then decrypted 510 with the existing user password. The result of the decryption 510 is that an authentication string is produced. A decision 512 then determines whether decryption was successful. Typically, the decryption is successful if the authentication string can be successfully recovered from the security system file with the old password. However, other authentication procedures or system access privileges may additionally be enforced to ensure that the user is permitted to change his/her password. When the decision 512 determines that the decryption was not successful, then the password change request is denied 514 and the change password processing 500 ends.

On the other hand, when the decision 512 determines that decryption was successful, then the authentication string is encrypted 516 using the new user password. The encryption of the authentication string produces a new encrypted authentication string. The new encrypted authentication string is then stored 518. Typically, the new encrypted authentication string would be stored where the old encrypted authentication string was previously stored. In one embodiment, the file containing at least the encrypted authentication string is referred to as a security system file. In one implementation, the storage 518 of the new encrypted authentication string would overwrite the previous encrypted authentication string. Following the operation 518, the change password processing 500 is complete and ends with the password change request having been performed.

Figure 6:
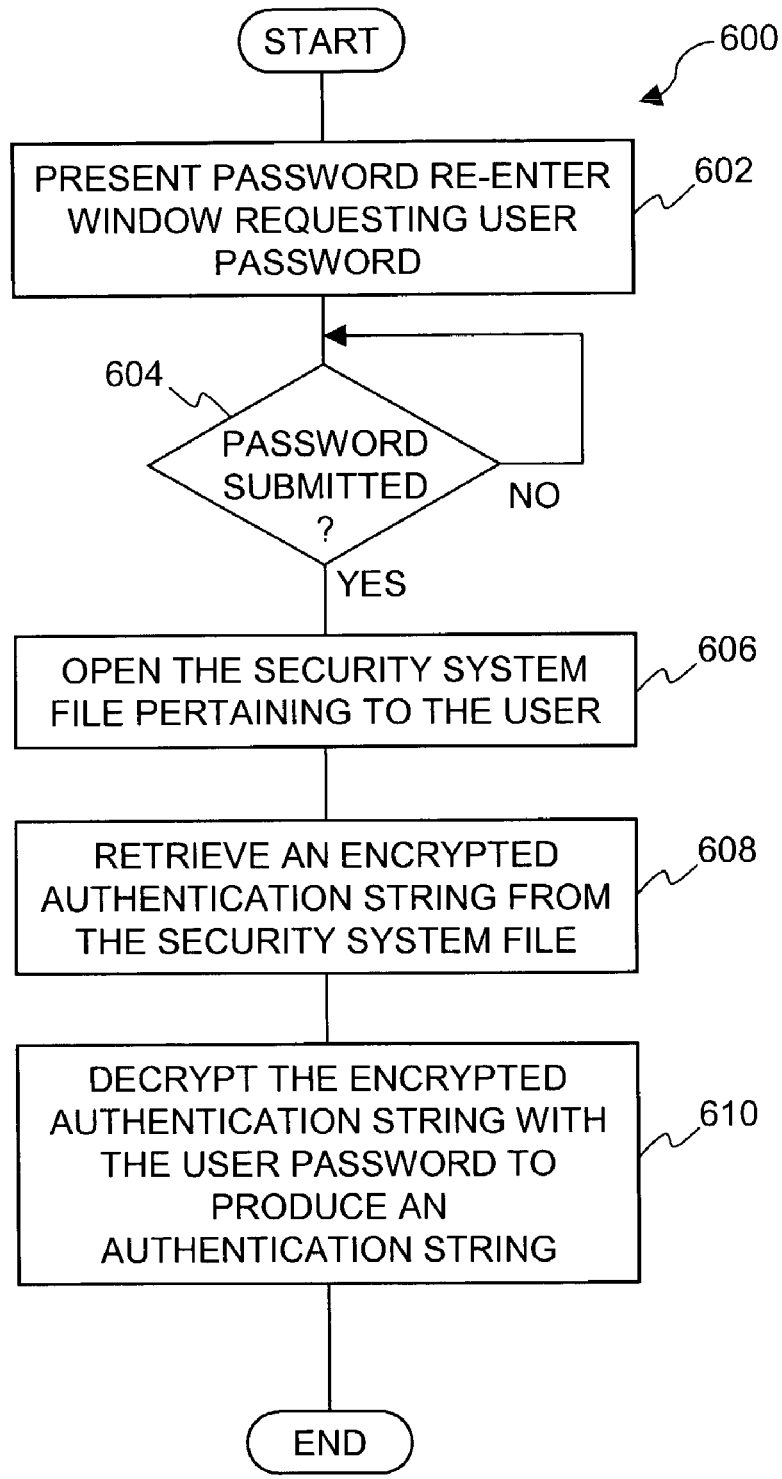
FIG. 6 is a flow diagram of re-authentication processing according to one embodiment of the invention.

FIG. 6 is a flow diagram of re-authentication processing 600 according to one embodiment of the invention. As noted above with respect to FIG. 2B, at times, a file security system may desire to re-authenticate a user. Re-authentication can provide the file security system with additional assurances that the user at the client machine is still the user that was previously authenticated and permitted access to the file security system. Typically, the re-authentication would be required by a file security system prior to performing important security tasks. One example of an important task is exporting a certificate associated with a user to another machine. As another example, a file security system can cause re-authentication to be periodically performed. In any case, when re-authentication is required, the re-authentication processing 600 can represent one embodiment of the user re-authentication processing that is performed at operation 228 of FIG. 2B.

The re-authentication processing 600 initially presents 602 a password re-enter window that requests a user to re-enter their password. A decision 604 then determines whether a user password has been submitted. When the decision 604 determines that a user password has not yet been submitted, the re-authentication processing 600 awaits such a submission. On the other hand, when the decision 604 determines that a password has been submitted, then the security system file pertaining to the user is opened 606. An encrypted authentication string is then retrieved 608 from the security system file. Here, the security system file is a file maintained by the file security system that includes at least an encrypted authentication string. In one embodiment, the security system file includes only the encrypted authentication string. In another embodiment, the security system file includes other information besides the encrypted authentication string and thus the retrieval can involve parsing the security system file to acquire the encrypted authentication string. Next, the authentication string is decrypted 610 from the security system file with the user password. The result of the decryption 610 is an authentication string that is used to authenticate the user, and allow the user to continue access to the secured files in the file security system.

Figure 7:
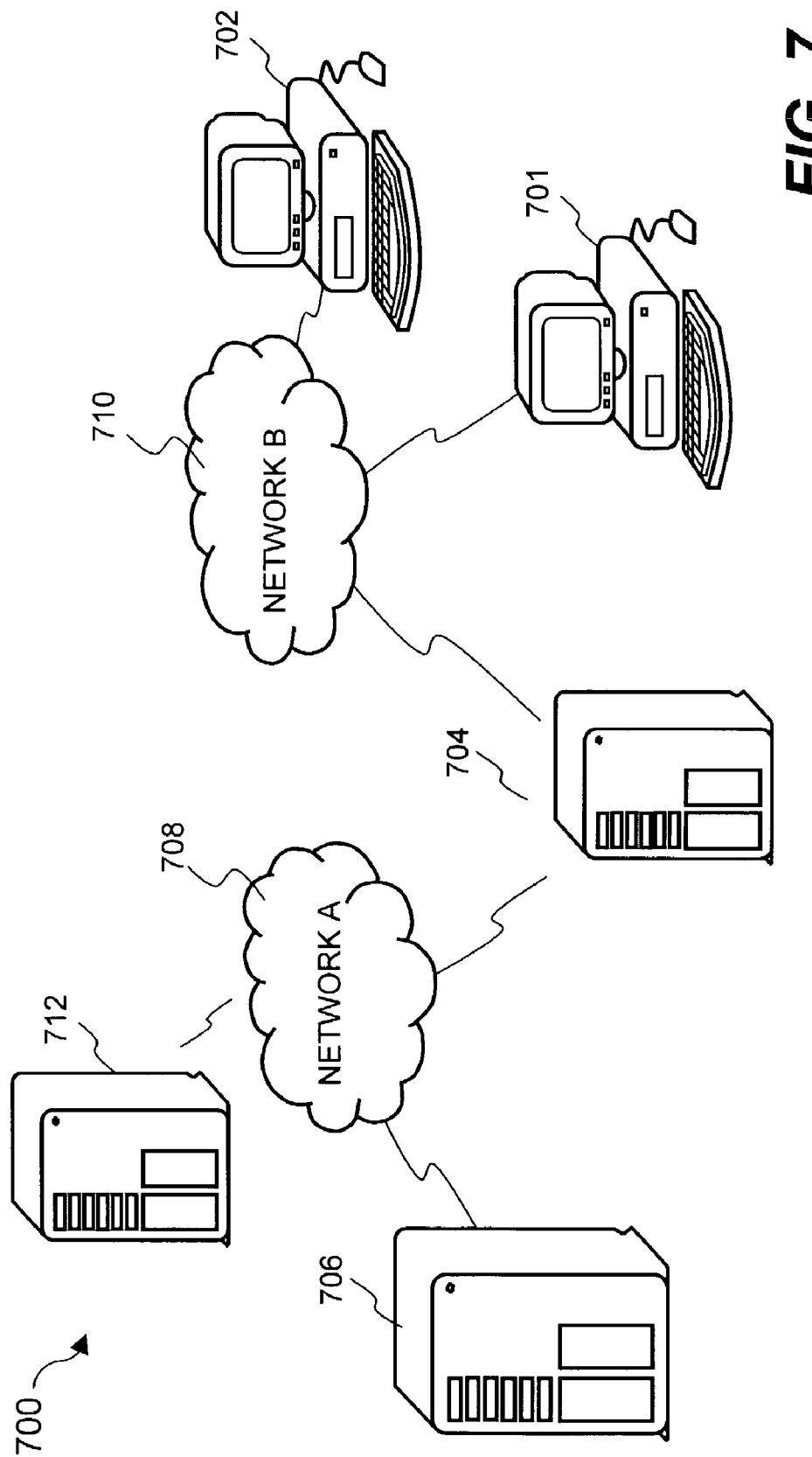
FIG. 7 shows a basic security system in which the invention may be practiced in accordance with one embodiment thereof.

FIG. 7 shows a basic security system 700 in which the invention may be practiced in accordance with one embodiment thereof. The security system 700 may be employed in an enterprise or inter-enterprise environment having a network A 708 and a network B 710. It includes a first server 706 (also referred to as a central server) providing centralized access management for the enterprise. The first server 706 can control restrictive access to files secured by the security system 700. To provide dependability, reliability and scalability of the system, one or more second servers 704 (also referred to as local servers, of which one is shown) may be employed to provide backup or distributed access management for users of client machines serviced locally. For illustration purposes, there are two client machines 701 and 702 being serviced by a local server 704. Alternatively, one of the client machines 701 and 702 may be considered as a networked storage device.

Secured files may be stored in either one of the devices 701, 702, 704, 706 and 712. When a user of the client machine 701 attempts to exchange a secured file with a remote destination 712 being used by an external user, one or more of the processing 200, 300, 400, 500, and 600 discussed above can be activated and be performed by the security system 700.

FIG. 8 shows an exemplary data structure 820 of a secured file that may be used in one embodiment of the invention. The data structure 820 includes two portions: a header (or header portion) 822 and encrypted data (or an encrypted data portion) 824. The header 822 can be generated in various forms depending on implementation. In one embodiment, the header 822 includes security information 826 that may further include a number of access rules 829 and a file key 830 and thus provides restrictive access to the data portion 824 which is an encrypted version of a plain file. Optionally, the data structure 820 may also include an error-checking portion 825 that stores one or more error-checking codes, for example, a separate error-checking code for each block of encrypted data 824. These error-checking codes may also be associated with a Cyclical Redundancy Check (CRC) for the header 822 and/or the encrypted data 824. The header 822 includes a flag bit or signature 827 and security information 826 that is in accordance with the security template for the store.

The security information 826 can vary depending upon implementation. However, as shown in FIG. 8, the security information 826 includes a user identifier (ID) 828, access policy (access rules) 829, a file key 830 and other information 831. Although multiple user identifiers may be used, a user identifier 828 is used to identify a user or a group that is permitted to access the secured file. The access rules 829 provide restrictive access to the encrypted data portion 824. The file key 830 is a cipher key that, once obtained, can be used to decrypt the encrypted data portion 824 and thus, in general, is protected. In one implementation of the data structure 820, the file key 830 is encrypted in conjunction with the access rules 829. In another implementation of the data structure 820, the file key 830 is double encrypted with a protection key and further protected by the access rules 829. The other information 831 is an additional space for other information to be stored within the security information 826. For example, the other information 831 may be used to include other information facilitating secure access to the secured file, such as version number or author identifier.

According to one embodiment, the above-noted encrypted authentication strings can be provided on a per-user or a per-group of users basis. With the appropriate user or group password, the encrypted authentication string can be successfully decrypted and utilized internal to the file security system as a password. In other words, the authentication string is used as a password for access to the file security system or the secured files therein.

Additional details on a security system can be found in U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of tangible computer readable media include read-only memory, random-access memory, CD-ROMs, DVDs, magnetic tape, and optical data storage devices. Examples of transmission media include carrier waves. Computer readable code from the tangible computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that user passwords are only stored in a transient manner, thus minimizing opportunities for unauthorized persons to crack the user passwords. Another advantage of the invention is that indirect passwords are used in place of passwords. The indirect passwords are normally be longer and more random, thus making an attack on passwords much more difficult. Still another advantage of the invention is that password modifications are able to be easily achieved by file security systems that protect secured files (e.g., documents) using indirect passwords. Yet still another advantage of the invention is that open software can be given an indirect password so as not to compromise a user password.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for authenticating a user to a file security system, the method comprising:
    receiving notification of a login request that includes at least a password associated with the user;
    decrypting an encrypted authentication string with the password received with the login request to produce a decrypted authentication string, the encrypted authentication string having been created using a random number of a predetermined length and encrypted using a previously-received password associated with the user; and
    determining whether the user is authenticated based on the decrypting.

2. The method as recited in claim 1, wherein the received password is never stored in a file by or for the file security system.

3. The method as recited in claim 1, wherein the received password is never stored in a non-volatile manner.

4. The method as recited in claim 1, further comprising:
    permitting access to files protected by the file security system in response to determining that the user is authenticated.

5. The method as recited in claim 1, further comprising:
    denying access to files protected by the file security system in response to determining that the user is not authenticated.

6. A method for authenticating a user to a file security system, the method comprising:
    receiving a password associated with the user;
    accessing an encrypted authentication string from a server machine associated with the file security system, the encrypted authentication string having been created using a random number of a predetermined length and encrypted using a previously-received password, wherein the encrypted authentication string is associated with the user;

decrypting the encrypted authentication string with the received password to produce a decrypted authentication string; and determining whether the user is authenticated based on the decrypting.

7. The method as recited in claim 6, further comprising removing the received password from memory after the decrypting.

8. The method as recited in claim 6, wherein the file security system is provided on at least one computer, the computer having non-volatile storage and volatile storage, the method further comprising:

removing the received password from the volatile storage after the decrypting, and wherein following receiving the password and before removing the received password after the decrypting, the received password is only stored in the volatile storage.

9. The method as recited in claim 6, the determining further comprising determining whether decryption of the encrypted authentication string was successful.

10. The method as recited in claim 6, further comprising:

permitting access to files protected by the file security system in response to determining that the user is authenticated.

11. The method as recited in claim 6, further comprising:

denying access to files protected by the file security system in response to determining that the user is not authenticated.

12. A method for re-authenticating a user to a file security system, where the user was previously authenticated to the file security system, comprising:

determining whether a re-authorization condition exists; and re-authenticating the user to the file security system in response to determining that the re-authorization condition exists, said re-authenticating includes at least:

receiving a password associated with the user;

accessing an encrypted authentication string from a server machine associated with the file security system;

decrypting the encrypted authentication string with the received password to produce an authentication string; and determining whether the user is re-authenticated based on said decrypting.

13. The method as recited in claim 12, wherein determining whether a re-authorization condition exists includes determining that the user is attempting to perform an operation with respect to the file security system that is deemed to be highly guarded.

14. The method as recited in claim 12, wherein determining whether a re-authorization condition exists includes determining that the user is attempting to export a certificate.

15. The method as recited in claim 12, wherein the re-authentication further includes the act of removing the received password from memory after the decrypting.

16. The method as recited in claim 12, wherein the file security system is provided on at least one computer, the computer having non-volatile storage and volatile storage, wherein the re-authentication further includes the act of:

removing the received password from the volatile storage after the decrypting, and wherein following the receiving of the password and before the removing, the received password is only stored in the volatile storage.

17. The method as recited in claim 12, the determining further comprising determining whether decryption of the encrypted authentication string was successful.

18. The method as recited in claim 12, further comprising:

permitting access to the file security system in response to determining that the user is re-authenticated.

19. The method as recited in claim 12, further comprising:

denying access to the file security system in response to determining that the user is not re-authenticated.

20. A method for changing a password of a user, wherein the password is associated with a file security system, the method comprising:

retrieving a stored, existing password associated with the user;

accessing an encrypted authentication string from a server machine associated with the file security system, the encrypted authentication string having been created by:

generating a random number of a predetermined length;

converting the random number into the authentication string; and encrypting the authentication string using the existing password, so as to associate the encrypted authentication string with the user;

decrypting the encrypted authentication string with the existing password to produce a decrypted authentication string; and determining whether the user is authenticated based on the decrypting.

21. The method as recited in claim 20, wherein the method does not require any of the files protected by the file security system to be modified if a password is changed for the user.

22. The method as recited in claim 20, further comprising:

denying the user from changing the password from the existing password to a new password in response to determining that the user is not authenticated.

23. The method as recited in claim 20, further comprising:

permitting a password to be changed from the existing password to the new password in response to determining that the user is authenticated.

24. The method as recited in claim 23, wherein the permitting comprises:

encrypting the authentication string using the new password to produce a new encrypted authentication string; and storing the new encrypted authentication string in the server machine for subsequent usage.

25. An article of manufacture including a computer readable medium having instructions stored thereon, that, in response to execution by a computing device, cause the computing device to perform operations for authenticating a user to a file security system, the operations comprising:

receiving a file access request including at least a password associated with the user;

decrypting an encrypted authentication string with the password received with the file access request to produce a decrypted authentication string, the encrypted authentication string having been created using a random number of a predetermined length and encrypted using a previously-received password associated with the user; and determining whether the user is authenticated based on the decrypting.

26. The article of manufacture as recited in claim 25, the operations further comprising:

permitting access to files protected by the file security system in response to determining that the user is authenticated.

27. The article of manufacture as recited in claim 25, the operations further comprising:
denying access to files protected by the file security system in response to determining that the user is not authenticated.

28. A computer readable medium having stored thereon, computer program code that, in response to execution by a computer, causes the computer to authenticate a user to a file security system by a method comprising:
receiving a password associated with the user;
accessing an encrypted authentication string from a server machine associated with the file security system, the encrypted authentication string having been created using a random number of a predetermined length and encrypted using a previously-received password, wherein the encrypted authentication string is associated with the user;
wherein the encrypted authentication string is associated with the user;
decrypting the encrypted authentication string with the received password to produce an authentication string; and
determining whether the user is authenticated based on the decrypting by the computer code for decrypting.

29. The computer readable medium as recited in claim 28, the method further comprising:
permitting access to files protected by the file security system in response to determining that the user is authenticated.

30. The computer readable medium as recited in claim 28, the method further comprising:
denying access to files protected by the file security system in response to determining that the user is not authenticated.

31. A computer readable medium having stored thereon, computer program code that, in response to execution by a computer, causes the computer to re-authenticate a user to a file security system by a method, where the user was previously authenticated to the file security system, the method comprising:
accessing an encrypted authentication string from a server machine associated with the file security system, wherein the encrypted authentication string is associated with the user;
determining whether a re-authorization condition exists; and
re-authenticating the user to the file security system when the re-authorization condition exists, the re-authenticating comprising:
receiving a password associated with the user;
accessing an encrypted authentication string from a server machine associated with the file security system;
decrypting the encrypted authentication string with the received password to produce an authentication string; and
determining whether the user is re-authenticated based on the decrypting by the computer code for decrypting.

32. The computer readable medium as recited in claim 31, the method further comprising:
permitting access to the file security system in response to determining that the user is re-authenticated.

33. The computer readable medium as recited in claim 31, the method further comprising:

denying access to the file security system determining determines that the user is not re-authenticated.

34. A tangible computer readable medium having instructions stored thereon to change a password associated with a file security system, the instructions comprising:
instructions to receive a new password;
instructions to retrieve a stored, existing password associated with the user;
instructions to access an encrypted authentication string from a server machine associated with the file security system, the encrypted authentication string having been created by:
generating a random number of a predetermined length;
converting the random number into the authentication string; and
encrypting the authentication string using the existing password,
wherein the encrypted authentication string is associated with a user;
instructions to decrypt the encrypted authentication string with the existing password to produce a decrypted authentication string; and
instructions to determine whether the user is authenticated based on the decrypting.

35. The tangible computer readable medium as recited in claim 34, the instructions further comprising:
instructions to deny the password to be changed from the existing password to the new password in response to determining that the user is not authenticated.

36. The tangible computer readable medium as recited in claim 34, the instructions further comprising:
instructions to permit the password to be changed from the existing user password to the new password in response to determining that the user is authenticated.

37. A method for authenticating a user to a file security system, wherein the file security system includes a server portion and at least one client portion, the server portion residing in a server machine, and the client portion residing in a client machine, the method comprising:
receiving a login request including at least a password associated with the user;
decrypting an encrypted authentication string with the password received with the login request to produce a decrypted authentication string, the encrypted authentication string having been created using a random number of a predetermined length and encrypted using a previously-received password associated with the user; and
determining whether the user is authenticated based on the decrypting.

38. The method as recited in claim 37, further comprising:
permitting access to files protected by the file security system in response to determining that the user is authenticated.

39. The method as recited in claim 37, further comprising:
denying access to files protected by the file security system in response to determining that the user is not authenticated.

40. A method for authenticating a user to a file security system, the method comprising:
generating a random number of a predetermined length;
converting the random number into an authentication string;
encrypting the authentication string using a previously-received password to produce an encrypted authentication string, wherein the encrypted authentication string and the previously-received password are associated with the user; and storing the encrypted authentication string in a server machine associated with the file security system for subsequent usage.

41. The method as recited in claim 40, wherein the file security system includes a server portion and at least one client portion, the server portion residing in a server machine, and the client portion residing in a client machine associated with the user, and further comprising causing the client machine to store the encrypted authentication string associated with the user.

42. The method as recited in claim 40, further comprising storing the encrypted authentication string in the server machine.

43. The method as recited in claim 40, wherein the method is performed on a client machine operating on a client portion of the file security system, and further comprising causing deletion of the received password after the authentication string is encrypted from memory of the client machine.

44. An article of manufacture including a computer readable medium having instructions stored thereon, that, in response to execution by a computing device, cause the computing device to perform operations for authenticating a user to a file security system, the operations comprising:

generating a random number of a predetermined length;

converting the random number into an authentication string;

encrypting the authentication string using a previously-the received password to produce an encrypted authentication string, wherein the encrypted authentication string and the previously-received password are is associated with the user; and storing the encrypted authentication string in a server machine associated with the file security system for subsequent usage.

45. A method for authenticating a user to a file security system, wherein the file security system includes a server portion and at least one client portion, the server portion residing in a server machine, and the client portion residing in a client machine, the method comprising:

generating a random number of a predetermined length;

converting the random number into an authentication string;

encrypting the authentication string using a previously-received password associated with a user to produce an encrypted authentication string; and storing the encrypted authentication string in the file security system to the server machine for subsequent usage.

* * * * *

UNITED STATES PATENT AND TRADEMARK OFFICE
CERTIFICATE OF CORRECTION

| | | |
|---|---|---|
| PATENT NO. | : 7,836,310 B1 | Page 1 of 1 |
| APPLICATION NO. | : 10/286524 | |
| DATED | : November 16, 2010 | |
| INVENTOR(S) | : Gutnik | |

It is certified that error appears in the above-identified patent and that said Letters Patent is hereby corrected as shown below:

Page 5, item (56), under "Other Publications", in Column 2, Lines 28-29, delete "idnetifying compunds" and insert -- identifying compounds --.

In the specifications:

Column 6, line 56, delete "001" and insert -- C01 --.

In the claims:

Column 18, lines 4-5, in Claim 44, delete "previously-the received" and insert -- previously-received --.

Column 18, line 7, in Claim 44, delete "are is" and insert -- are --.

Signed and Sealed this

Twenty-sixth Day of April, 2011

David J. Kappos
*Director of the United States Patent and Trademark Office*